United States Patent
Ramasamy et al.

(10) Patent No.: US 12,307,504 B2
(45) Date of Patent: May 20, 2025

(54) METHODS AND APPARATUS FOR AUTOMATIC ORDER ASSIGNMENT

(71) Applicant: Walmart Apollo, LLC, Bentonville, AR (US)

(72) Inventors: Thiyagarajan Ramasamy, Bangalore (IN); Prakash Kamani, Bangalore (IN); Aanchal Adhaulia, Bangalore (IN); Ratheesh Kumar V D, Bangalore (IN); Ravi Kayasth, Bengaluru (IN); Yogesh Joshi, Bengaluru (IN); Vrajeshkumar Laxmikant Mistry, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 267 days.

(21) Appl. No.: 17/815,649

(22) Filed: Jul. 28, 2022

(65) Prior Publication Data
US 2023/0031627 A1   Feb. 2, 2023

Related U.S. Application Data

(60) Provisional application No. 63/227,259, filed on Jul. 29, 2021.

(51) Int. Cl.
*G06Q 30/0201* (2023.01)
*G06Q 10/0639* (2023.01)
*G06Q 30/0601* (2023.01)

(52) U.S. Cl.
CPC ..... *G06Q 30/0635* (2013.01); *G06Q 10/0639* (2013.01); *G06Q 30/0201* (2013.01); *G06Q 30/0603* (2013.01)

(58) Field of Classification Search
None
See application file for complete search history.

(56) References Cited

U.S. PATENT DOCUMENTS

| 5,734,890 A | * | 3/1998 | Case | G06Q 30/02 707/999.005 |
| 8,046,269 B2 | * | 10/2011 | Lee | G06Q 40/04 705/26.3 |

(Continued)

FOREIGN PATENT DOCUMENTS

| KR | 102222383 B1 | 3/2021 | |
| WO | WO-2006047595 A2 * | 5/2006 | ....... G06Q 10/06393 |
| WO | WO-2015176071 A2 * | 11/2015 | ............... C12Q 1/68 |

OTHER PUBLICATIONS

Yahya et al "Vendor Rating got an Entrepreneur Development Programme: A Case Study Using the Analytic Hierarchy Process Method", The Journal of the Operational Research Society, Sep. 1999, vol. 50 No. 9, pp. 916-930 (Year: 1999).*

(Continued)

*Primary Examiner* — Romain Jeanty
(74) *Attorney, Agent, or Firm* — Morgan, Lewis & Bockius LLP; Manita Rawat (57) ABSTRACT

This application relates to apparatus and methods for automatically scheduling pickup and deliveries of ordered items. In some examples, an order for purchased items is received. The order may be for pickup or delivery. A first subset of a plurality of vendors are determined to be eligible to execute the pickup or delivery based on applying a set of vendor rules to the order. From the first subset of vendors, a second set of vendors are determined to have capacity based on applying a first set of algorithms to the order and to capacity data. The second set of vendors may then be ranked based on applying a second set of algorithms to the order and to performance data. The order is assigned to the highest ranked vendor. In some examples, the first set of algorithms and the second set of algorithms include one or more trained machine learning models.

18 Claims, 6 Drawing Sheets

(56) References Cited

U.S. PATENT DOCUMENTS

| | | | | |
|---|---|---|---|---|
| 8,078,485 | B1* | 12/2011 | Kraehmueller | G06Q 10/063 705/7.29 |
| 8,200,527 | B1* | 6/2012 | Thompson | G06Q 30/00 705/7.41 |
| 8,214,238 | B1* | 7/2012 | Fairfield | G06Q 30/0203 705/7.29 |
| 11,100,440 | B1* | 8/2021 | Davies | G06Q 30/0633 |
| 11,126,953 | B2 | 9/2021 | Smith et al. | |
| 2002/0055900 | A1* | 5/2002 | Kansal | G06Q 30/0283 705/37 |
| 2005/0144082 | A1* | 6/2005 | Coolman | G06Q 30/0635 705/26.81 |
| 2006/0089869 | A1* | 4/2006 | Mundy | G06Q 10/0639 705/7.38 |
| 2010/0312648 | A1* | 12/2010 | Gerome | G06Q 30/02 705/14.66 |
| 2012/0265744 | A1* | 10/2012 | Berkowitz | G06Q 30/0613 707/705 |
| 2015/0193709 | A1* | 7/2015 | Ramesh Babu | G06Q 10/067 705/7.28 |
| 2016/0110788 | A1* | 4/2016 | Stephenson | G06Q 10/087 705/7.29 |
| 2017/0024783 | A1* | 1/2017 | Gupta | G06F 16/24578 |
| 2020/0160428 | A1 | 5/2020 | Calvo et al. | |
| 2022/0092521 | A1 | 3/2022 | Hunter et al. | |

OTHER PUBLICATIONS

S. Yahya et al "Vendor Rating for an Entrepreneur Development Programme: A Case Study Using the Analytic Hierarchy Process Method", Sep. 1999, The Journal of the Operational Research Society, pp. 916-930 (15 pages) (Year: 1999).*

Sheng "Data-Driven Order Assignment for Last Mile Delivery", Department of Industrial Engineering and Operations Research University of California, pp. 1-44 (Year: 2018).*

* cited by examiner

METHODS AND APPARATUS FOR AUTOMATIC ORDER ASSIGNMENT

CROSS-REFERENCE TO RELATED APPLICATIONS

This application claims priority to U.S. Provisional Application Ser. No. 63/227,259, filed on Jul. 29, 2021 and entitled "METHODS AND APPARATUS FOR AUTOMATIC ORDER ASSIGNMENT," and which is hereby incorporated by reference in its entirety.

TECHNICAL FIELD

The disclosure relates generally to scheduling deliveries and, more specifically, to automatic processes for scheduling pickup and deliveries of ordered items.

BACKGROUND

At least some retailers allow customers to make purchases, and further to schedule delivery or pickup of those purchases. For example, a website, such as a retailer's website, may allow customers to purchase items. Upon checkout, the website may provide the customer an option to have the purchases items delivered, or picked up at a store. For deliveries, the website may allow the customer to select a time window to have the purchased items delivered to a delivery address. Alternatively for pickups, the website may provide a time of when the purchased items will be available for pickup at a retail location. For deliveries and pickups, the purchased items must be found on store shelves, placed in bags, and either placed on a delivery truck for delivery or placed in a pickup area of a store for pickups.

There are, however, various costs associated with these services. For example, there are labor costs for personnel that gather and bag the ordered items and personnel that deliver the ordered items, as well as delivery costs including gas and delivery truck maintenance costs. In some examples, a retailer may employ vendors to assist with order preparation and delivery, but the retailer nonetheless pays the vendors for the services. Moreover, vendors may provide varying levels of customer service and differing pricing plans, which may result in less satisfied customers and higher costs. In addition, scheduling personnel may present challenges, as demand may vary throughout the year and even throughout a week and each day. For example, a retailer may have too many "pickers" (those that gather and bag ordered items) scheduled when demand is low, or alternatively may not have enough pickers when demand is high. As such, there are opportunities to improve the scheduling and assignment of orders for delivery and/or pickup.

SUMMARY

The embodiments described herein are directed to automatic processes for selecting and assigning an order to a vendor for preparation and, in some examples, for delivery. For example, a retailer may have a plurality of vendors that provide order preparation and/or delivery services. The retailer may receive a purchase order (e.g., for an order placed on the retailer's website), and may execute one or more algorithms (e.g., machine learning based models) to select one of the plurality of vendors to assign the order to. For example, the embodiments may determine one or more initial vendors to assign the order to based on one or more eligibility rules and business rules. The embodiments may further determine which of the initial set of vendors has capacity for the order. Based on the vendors with capacity, the embodiments identify a preferred vendor to assign the order to. In some examples, the embodiments generate a ranked list of vendors to assign the item to.

In some examples, an order for purchased items is received. The order may be for pickup or delivery. A first subset of a plurality of vendors are determined to be eligible to execute the pickup or delivery based on applying a set of vendor rules to the order. From the first subset of vendors, a second set of vendors are determined to have capacity based on applying a first set of algorithms to the order and to capacity data. The second set of vendors may then be ranked based on applying a second set of algorithms to the order and to performance data. The order is assigned to the highest ranked vendor. In some examples, the first set of algorithms and the second set of algorithms include one or more trained machine learning models.

For example, and in accordance with various embodiments, exemplary systems may be implemented in any suitable hardware or hardware and software, such as in any suitable computing device. For example, in some embodiments, a computing device is configured to receive order data identifying an order for at least one item. The computing device is also configured to determine whether each of a plurality of vendors are eligible for the order based on at least one rule and the order data. The computing device is further configured to determine whether each of the plurality of vendors determined to be eligible have capacity for the order based on capacity data and the order data. Additionally, the computing device is configured to determine a first vendor from the plurality of vendors determined to have capacity based on performance data. The computing device is further configured to transmit an indication of the first vendor.

In some embodiments, a method is provided that includes receiving order data identifying an order for at least one item. The method also includes determining whether each of a plurality of vendors are eligible for the order based on at least one rule and the order data. The method further includes determining whether each of the plurality of vendors determined to be eligible have capacity for the order based on capacity data and the order data. Additionally, the method includes determining a first vendor from the plurality of vendors determined to have capacity based on performance data. The method further includes transmitting an indication of the first vendor.

In yet other embodiments, a non-transitory computer readable medium has instructions stored thereon, where the instructions, when executed by at least one processor, cause a computing device to perform operations that include receiving order data identifying an order for at least one item. The operations also include determining whether each of a plurality of vendors are eligible for the order based on at least one rule and the order data. The operations further include determining whether each of the plurality of vendors determined to be eligible have capacity for the order based on capacity data and the order data. Additionally, the operations include determining a first vendor from the plurality of vendors determined to have capacity based on performance data. The operations further include transmitting an indication of the first vendor.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Retailers may employ vendors (e.g., third parties, staffing companies, delivery companies, etc.) to assist with order preparation, such as gathering and bagging purchased goods, and/or order delivery. The embodiments provided herein may include one or more algorithms that may include rules and machine learning based processes to identify (e.g., select) a vendor from a plurality of vendors to prepare and/or deliver purchased items. For example, a customer may place an order for one or more items on a retailer's website. The customer may select to pick up the order at a local retail location for the retailer during a timeslot, such as between certain hours on a particular day, for example. Upon receiving the order, the embodiments may automatically, in real-time, determine and assign a vendor to the order to for order preparation (e.g., gathering the purchased items from store shelves, placing them in bags, and delivering them to a pick-up area at the retail location). As another example, the customer may place the order, but select to have the order delivered to an address, such as a home address, during a particular timeslot. The embodiments may automatically, in real-time, determine and assign a vendor to the order to for order preparation and delivery. In some examples, the embodiments may assign one vendor to prepare the order, and another vendor to deliver the order.

The algorithms employed by the embodiments may operate on order data, rule data, capability data, and performance data, as described herein, to determine and assign the order to a vendor. Order data may include, for example, item quantities for an order, number of distinct items in an order, a total value of an order (e.g., price paid), volume of items in the order, item categories, and payment method used for the order, among other data. Capability data may include, for example, a resource type (e.g., picker, deliverer, picker and deliverer), vendor restrictions, availability (e.g., schedule information), vehicle type, count, and capacity, and an associated cost (e.g., with selecting a particular vendor), among other data. Rule data may include, for example, catchment rules, lead time rules, restriction rules (e.g., age restriction rules), and item category rules, among other data. Performance data may include number of current order assignments, timeliness of past assignments, a number of available personnel, and past assignment cancellations, among other data.

Figure 1:
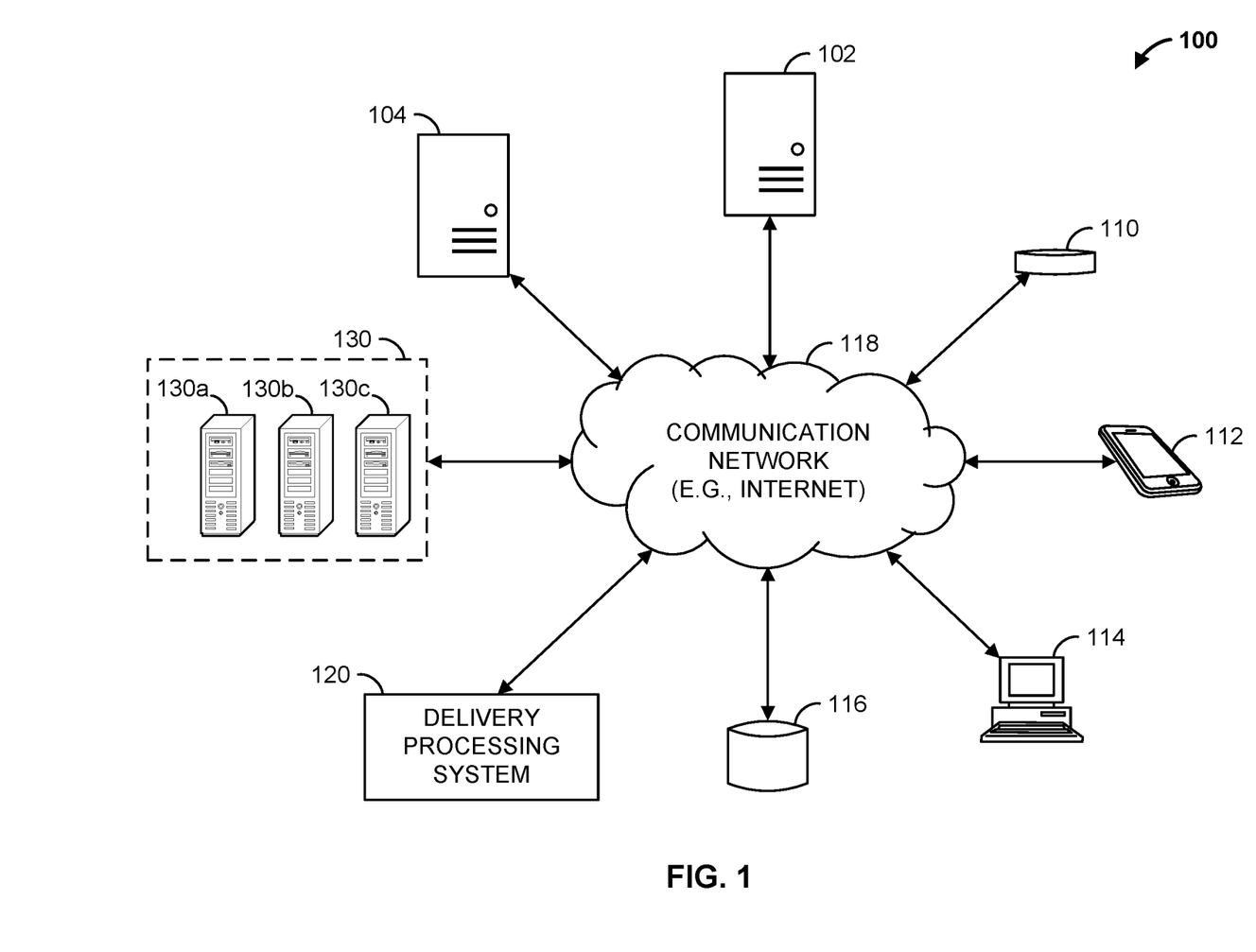
FIG. 1 is a block diagram of an order assignment system in accordance with some embodiments.

Turning to the drawings, FIG. 1 illustrates a block diagram of an order assignment system 100 that includes order assignment computing device 102 (e.g., a server, such as an application server), a web server 104, vendor systems 130, delivery processing system 120, and multiple customer computing devices 110, 112, 114 operatively coupled over network 118. Order assignment computing device 102, web server 104, vendor systems 130, delivery processing system 120, and multiple customer computing devices 110, 112, 114 can each be or include any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of order assignment computing device 102, web server 104, and vendor computing devices 130a, 130b, and 130c of vendor systems 130 can be a computer, a workstation, a laptop, a server such as a cloud-based server, or any other suitable device. Delivery processing system 120 can include one or more computer, servers, workstations, laptops, or any other suitable computing device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, web server 104, order assignment computing device 102, and delivery processing system 120 are operated by a retailer, and multiple customer computing devices 112, 114 are operated by customers of the retailer. Moreover, each of vendor computing devices 130a, 130b, and 130c of vendor systems 130 may be operated by a vendor (e.g., vendor that provides order preparation and/or delivery services).

Although FIG. 1 illustrates three customer computing devices 110, 112, 114, order assignment system 100 can include any number of customer computing devices 110, 112, 114. Similarly, order assignment system 100 can include any number of order assignment computing devices 102, web servers 104, vendor computing devices 130a, 130b, and 130c, delivery processing systems 120, and databases 116.

In some examples, web server 104 hosts one or more web pages, such as a retailer's website. The website may allow for the purchase of items. For example, first customer computing device 110, second customer computing device 112, and N$^{th}$ customer computing device 114 may communicate with web server 104 over communication network 118. In addition, each of multiple computing devices 110, 112, 114 may be operable to view, access, and interact with the website hosted by web server 104. In some examples, the website allows a customer to search for items via, for example, a search bar. A customer operating one of multiple computing devices 110, 112, 114 may access the website via an executed browsing application, and allow the customer to add one or more items to an online shopping cart. The website may further allow the customer to perform a "checkout" of the shopping cart to purchase the items.

In some examples, web server 104 transmits order data identifying an order for purchased items to order assignment computing device 102. In response, order assignment computing device 102 may determine a vendor to assign the order to for order preparation and/or delivery. For example, a first vendor may operate vendor computing device 130a, a second vendor may operate vendor computing device 130b, and a third vendor may operate vendor computing device 130c. Order assignment computing device 102 may determine one of the first vendor, second vendor, and third vendor to assign the order to for order preparation, and may transmit an indication of the assignment to the determined vendor. In some examples, the assignment is transmitted to delivery processing system 120, which may facilitate the assignment of orders (e.g., for preparation and/or delivery) among the various vendors. For example, delivery processing system 120 may provide an application programming interface (API) to each of vendor computing devices 130a, 130b, 130c, which allows each vendor to determine orders assigned to that particular vendor.

Order assignment computing device 102 is further operable to communicate with database 116 over communication network 118. For example, order assignment computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to order assignment computing device 102, in some examples, database 116 can be a local storage device, such as a hard drive, a non-volatile memory, or a USB stick.

Order assignment computing device 102 may store order data received from web server 104 in database 116. The order data may identify and characterize purchase transactions from a website, for example. Database 116 may also store rule data, capability data, and performance data, as described herein. Additionally, database 116 may store item catalog data characterizing and identifying one or more items and corresponding item attributes (e.g., product type, brand, options, features, etc.), such as for items sold at a retailer's website (e.g., hosted by webserver 104).

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Order assignment computing device 102 may receive, from web server 104, order data identifying an order for one or more items. Order assignment computing device 102 may determine whether each of a plurality of vendors, such as vendors operating each of vendor computing devices 130a, 130b, 130c, are eligible for the order based on at least one rule and the order data. For example, each vendor may be associated with one or more rules. The rules may be configured by a user for each vendor. For example, a vendor may have a maximum allowed volume for an order. Order assignment computing device 102 may determine a total volume of a received order based on volumes of each individual item of the order, and determine if the total volume exceeds the maximum allowed volume for the vendor. If the maximum allowed volume is exceeded, the vendor is not eligible. As another example, a vendor may not be allowed to handle particular item types (e.g., items priced over a threshold amount, certain types of refreshments, items with a volume larger than a threshold amount, etc.). If the order includes such a prohibited item, the vendor is not eligible. Assuming an order is to be delivered by a vendor, additional rules may include delivery location restrictions. For example, a vendor may not provide deliveries in a certain geographical area, such as a zip code. If a delivery address for the order is in such a geographical area, the vendor is not eligible. Order assignment computing device 102 may apply one or more rules to each vendor and determine, based on the application of the rules, which vendors are not eligible, and remove ineligible vendors from further consideration.

For any vendors that are eligible (e.g., vendors that did not violate a rule), order assignment computing device 102 may apply one or more algorithms to vendor data and the order data to determine if each vendor has capacity for the order. For example, order assignment computing device 102 may determine a picking time (e.g., time to gather and bog items), such as an average picking time, for each vendor based on prior assignments. Order assignment computing device 102 may also determine a current number of shoppers and a current number of assigned orders to the vendor. Order assignment computing device 102 may further determine vendor performance data for the vendor, which may include, for example, an average picking time over a previous period of time (e.g., such as a week, a month, a quarter, a year, etc.), an average delivery time over a previous period of time, and a determination of a proportion of late deliveries to all deliveries over a previous period of time, among other performance data.

Based on the picking time, the current number of shoppers, the current number of assigned orders, and the vendor performance data, order assignment computing device 102 may determine whether the vendor has capacity. For example, order assignment computing device 102 may generate a vendor capacity score for the vendor based on the picking time, the current number of shoppers, the current number of assigned orders, and vendor performance data. In some examples, order assignment computing device 102 applies a weight to each of the data characterizing the picking time, the current number of shoppers, the current number of assigned orders, and the vendor performance data, and determines the vendor capacity score based on the weighted data. In some examples, a higher picking time, a higher number of assigned orders, a higher average picking time, a higher average delivery time, and a higher proportion of late deliveries may negatively affect the vendor capacity score, while a higher current number of shoppers positively affects the vendor capacity score. Comparatively, a lower picking time, a lower number of assigned orders, a lower average picking time, a lower average delivery time, and a lower proportion of late deliveries may positively affect the vendor capacity score, while a lower current number of shoppers negatively affects the vendor capacity score.

Order assignment computing device 102 may compare each vendor capacity score to a capacity score threshold. Vendors with a vendor capacity score beyond (e.g., exceeding) the capacity score threshold may be determined to have capacity.

In some examples, and for orders that are to be delivered, order assignment computing device 102 may further determine whether a vendor has capacity based on a delivery location for the order and, in some examples, traffic data, such as traffic data from a pickup location to the delivery location. The traffic data may be obtained, for example, from a traffic data delivery service in real-time.

In some examples, the one or more algorithms include a machine learning based model that is trained on feature data generated from data characterizing, for each of a plurality of orders for each of a plurality of vendors, a corresponding number of shoppers, a corresponding number of assigned orders, and corresponding vendor performance data.

Order assignment computing device 102 may further determine, from those vendors determined to have capacity, a vendor to which to assign the order to. For example, order assignment computing device 102 may apply, for each of the vendors with capacity, one or more algorithms to vendor data to determine a final vendor score. For example, the vendor with the highest score is selected. The vendor data may include, for example, delivery location, timeslot (e.g., for pickup or delivery), vendor performance data, vendor rating data (e.g., ratings based on delivery locations), on-time-delivery data, and vendor charges (e.g., cost to the retailer to assign the order to the vendor). Order assignment computing device 102 may assign the order to the selected vendor (e.g., via delivery processing system 120).

In some examples, order assignment computing device 102 generates a ranked list of vendors based on the final vendor scores. Order assignment computing device 102 may assign the order to the vendor with the highest final vendor score, for example. The vendor may, via delivery processing system 120, accept, or reject, the assigned order. If the vendor accepts the order, order assignment computing device 102 determines that the order has been assigned to the vendor. If the vendor rejects the order, order assignment computing device 102 attempts to assign the order to the vendor with the next highest final vendor score. Order assignment computing device 102 may continue to attempt to assign the order to vendors based on the ranked list until a vendor has accepted the order.

In some examples, order assignment computing device 102 receives order data for an order of at least one item from web server 104. Order assignment computing device 102 determines a first subset of vendors out of a plurality of vendors that are eligible for the order based on at least one rule and the order data. Further, order assignment computing device 102 obtains, from database 116, capacity data for each of the first subset of vendors. Order assignment computing device 102 determines, out of the first subset of vendors, a second subset of vendors that have capacity for the order based on the capacity data corresponding to each of the second subset of vendors and the order data. Moreover, order assignment computing device 102 obtains, from database 116, performance data for each of the second subset of vendors. Order assignment computing device 102 determines at least one vendor from the second subset of vendors based on the performance data corresponding to each of the at least one vendor. Further, order assignment computing device 102 transmits an indication of the at least one vendor. For example, order assignment computing device 102 may transmit the indication to delivery processing system 120 for assignment to the at least one vendor. The at least one vendor, operating one of vendor computing devices 130a, 130b, and 130c, may receive the order assignment and, in some examples, accept, or deny, the order assignment.

In some examples, determining the first subset of vendors comprises obtaining, from database 116, vendor capability data for each of the plurality of vendors and catalog data for each of the at least one items, and applying the at least one rule the vendor capability data and the catalog data.

In some examples, determining the second subset of vendors comprises obtaining, from database 116, vendor capability data and vendor performance data for each of the first subset of vendors, and applying a trained machine learning model to the vendor capability data and the vendor performance data. In some examples, determining the second subset of vendors comprises generating a vendor capacity score for each of the first subset of vendors based on application of the trained machine learning model, and determining the second subset of vendors based on the generated vendor capacity scores.

In some examples, order assignment computing device 102 obtains, from database 116, historical vendor capability data and historical vendor performance data. Order assignment computing device 102 generates features based on the historical vendor capability data and the historical vendor performance data, and trains the trained machine learning model with the generated features.

In some examples, determining the at least one vendor comprises obtaining, from the database, vendor performance data for each of the second subset of vendors, and applying a trained machine learning model to the vendor performance data. In some examples, order assignment computing device 102 obtains, from database 116, historical vendor performance data. Further, order assignment computing device 102 generates features based on the historical vendor performance data, and trains the trained machine learning model with the generated features.

In some examples, determining the at least one vendor comprises determining, for each of the second subset of vendors, an order performance score, a location score for a location for delivery of the order, an on-time delivery score, and a vendor cost score, determining, for each of the second subset of vendors, a final vendor score based on the order performance score, the location score, the on-time delivery score, and the vendor cost score, and determining the at least one vendor based on the final vendor scores. In some examples, determining final vendor score for each of the second subset of vendors comprises applying a first weight to the order performance score, applying a second weight to the location score, applying a third weight to the on-time delivery score, applying a fourth weight to the vendor cost score, and determining the at least one vendor based on the weighted final vendor scores.

Figure 2:
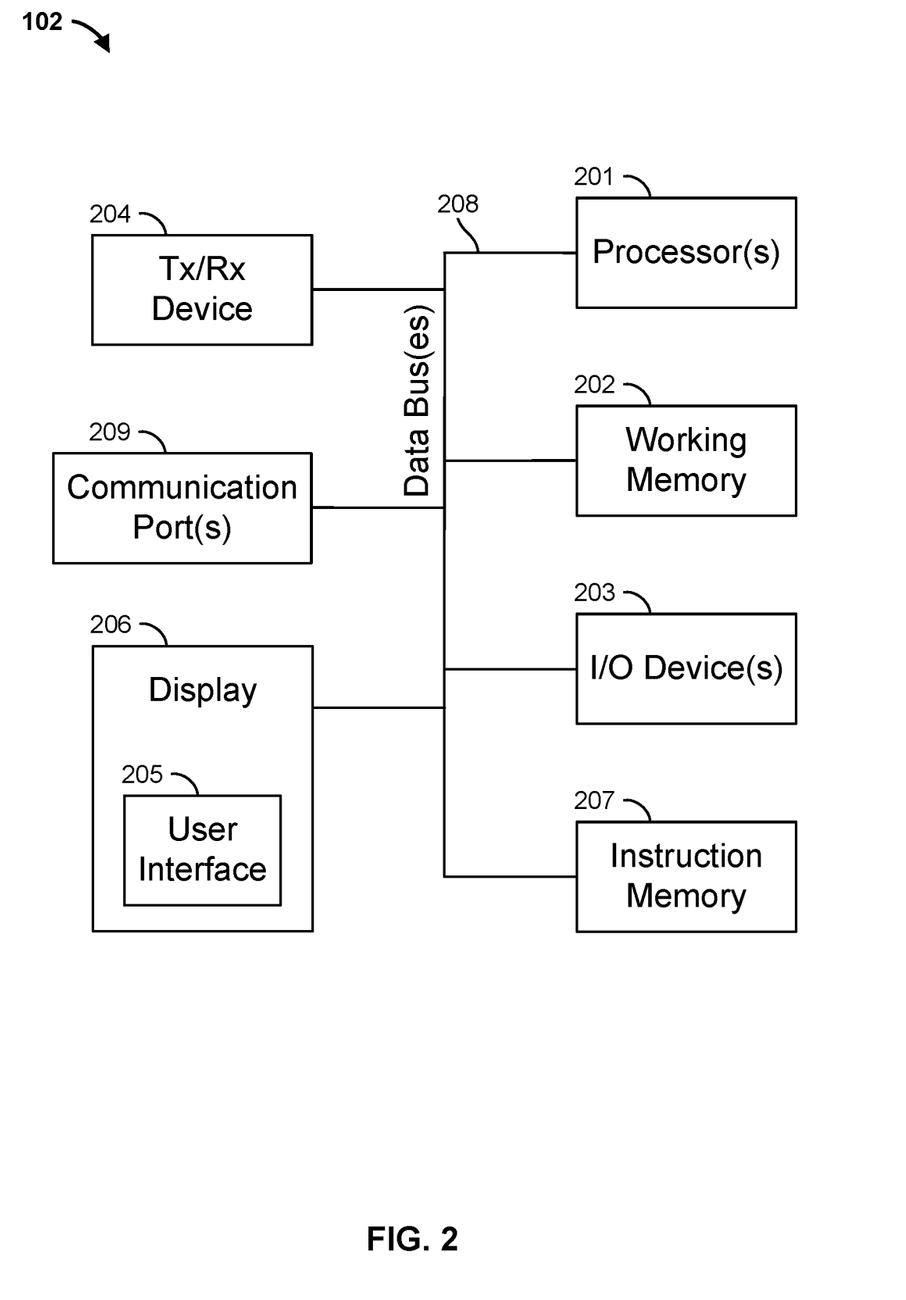
FIG. 2 is a block diagram of an order assignment computing device in accordance with some embodiments.

FIG. 2 illustrates the order assignment computing device 102 of FIG. 1. Order assignment computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of order assignment computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as vendor data.

Display 206 can display user interface 205. User interfaces 205 can enable user interaction with order assignment computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 order assignment computing device 102 will be operating in. Processor(s) 201 is operable to receive data from, or send data to, a network, such as communication network 118 of FIG. 1, via transceiver 204.

Figure 3:
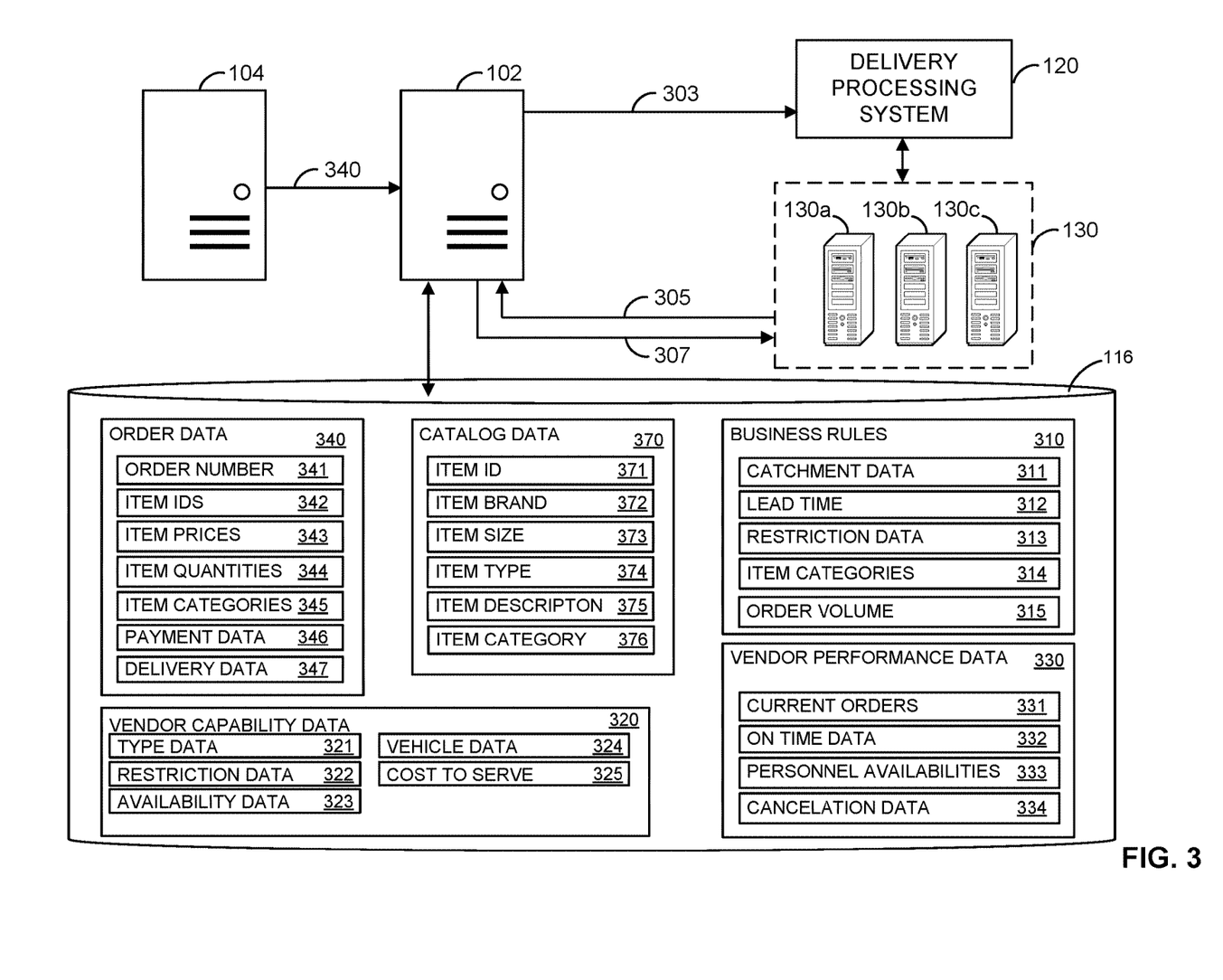
FIG. 3 is a block diagram illustrating examples of various portions of the order assignment system of FIG. 1 in accordance with some embodiments.

FIG. 3 is a block diagram illustrating examples of various portions of the order assignment system 100 of FIG. 1. As indicated in the figure, order assignment computing device 102 may receive order data 340 from web server 104. Order data 340 may identify and characterize an order purchased by a customer on a website, such as a retailer's website hosted by web server 104. Order assignment computing device 102 may store order data 340 within database 116. In this example, order data 340 may include, for each purchase, one or more of an order number 341 identifying a purchase order, item IDs 342 identifying one or more items purchased in the purchase order, item prices 343 identifying a price for each item purchased, item quantities 344 identifying a quantity of each item purchased, item categories 345 identifying a category of each item purchased, and payment data 346, identifying a form of payment (e.g., credit card, debit card, cash, check, etc.) and a payment date for the order. Order data 340 may further include delivery data 347, which indicates whether an order is to be picked up or delivered, and a corresponding timeslot.

Database 116 further stores catalog data 370, which includes information associated with each of a plurality of items, such as items sold on a retailer's website hosted by web server 104. Catalog data 370 may include an item ID 371 (e.g., UPC number), an item brand 372, an item size 373 (e.g., volume of the item), an item type 374 (e.g., grocery item such as milk, clothing item), an item description 375 (e.g., a description of the product including product features, such as ingredients, benefits, use or consumption instructions, or any other suitable description), and item options 380 (e.g., item colors, sizes, flavors, etc.), and an item category 376 (e.g., soap, bread, mile, etc.).

Order assignment computing device 102 may determine, out of a plurality of vendors, vendors that are eligible to assign the order to based on one or more business rules 310. Each vendor may have a corresponding set of business rules 310. For example, order assignment computing device 102 may determine whether each vendor violates one or more of corresponding business rules 310 and, if no rules are violated, the vendor is eligible. Business rules 310 may be stored in database 116 and may include rules based on, among others, catchment data 311, lead time 312, restriction data 313, and item categories 314. For example, item category rule 314 examples may include a rule indicating that the vendor must be able to handle and/or deliver flammable items, items over a certain size (e.g., by volume, height, etc.), or a type of item, such as pharmacy items.

Catchment data 311 may include rules based on how far a delivery may be from a particular location, such as from a store. For example, a vendor may not wish to deliver orders that are further than a threshold distance from a pickup location. Thus, order assignment computing device 102 may disqualify vendors where the distance from pickup to delivery is greater than the threshold distance for the vendor. Lead time 312 includes one or more rules based on a minimum lead time. For example, a vendor may not wish to delivery items without a minimum lead time (e.g., amount of time the vendor is notified before delivery needs to be satisfied). Thus, order assignment computing device 102 may disqualify vendors with a lead time 312 that is greater than an amount of time before the order is to be delivered.

Restriction data 313 may include, for example, rules based on an age of the customer. For example, restriction data 313 may indicate that a vendor is willing to deliver orders only for customers 21 years of age and older. If a buyer is under 21, order assignment computing device 102 may disqualify the vendor from consideration. Further, item categories 314 may identify types of items that a vendor is not willing to deliver, such as items priced over a threshold amount, certain types of refreshments, items with a volume larger than a threshold amount, etc. If an order includes an item of a particular item category 314, order assignment computing device 102 may disqualify the vendor from consideration.

Item volume 315 may indicate a total volume of an order the vendor is willing to prepare or deliver. If a total volume for an order is greater than item volume 315, order assignment computing device 102 may disqualify the vendor from consideration. Order assignment computing device 102 may determine the total volume for the order based on item size 373 for each item ordered. For example, order assignment computing device 102 may, for each ordered item, obtain from database 116 the item size 373 for the, and multiply the item size by the corresponding item quantity 344 for the item to determine an item's total volume. Order assignment computing device 102 may then add the total volumes for all of the items to determine the total volume for the order.

For those vendors that are determined to be eligible, order assignment computing device 102 may determine whether they have capacity for the order. If they do not have capacity for the order, they are disqualified from further consideration for assignment. To determine eligibility, order assignment computing device 102 may apply one or more algorithms to capacity to generate a vendor capacity score for the vendor. Capacity data may include, for example, portions of vendor capability data 320 and vendor performance data 330.

Vendor capability data 320 includes type data 321 identifying whether a vendor is capable of order preparation, order delivery, or both. Vendor capability data 320 also includes restriction data 322 identifying vendor restrictions, availability data identifying vendor availability (e.g., work schedules), and vehicle data 324 identifying, for example, a number of available vehicles and a cargo space (e.g., volume) available in each vehicle. Vendor capability data 320 may further include cost to serve data 325, which may identify and characterize a cost charged to the retailer for order preparation and/or delivery services (e.g., per order).

Vendor performance data 330 includes current orders 331 identifying current orders with a vendor, on time data 332 identifying whether past order preparations and deliveries have been delivered on time, personnel availabilities 333 (e.g., a number of workers, such as pickers, available during various time periods), and cancellation data 334 identifying assigned orders that have been cancelled by the vendor (e.g., after they were originally accepted or assigned to the vendor).

Assuming the assignment is for order preparation, vendors whose type data 321 indicate they are valuable only for order deliveries are disqualified. Similarly, and assuming the assignment is for order delivery, vendors whose type data 321 indicate they are available only for order preparation are disqualified.

Moreover, in some examples, order assignment computing device 102 generates the vendor capacity score for the vendor based on delivery data 347, current orders 331, and vendor performance data 330. In some examples, generates the vendor capacity score for the vendor based on delivery data 347, current orders 331, vendor performance data 330, and a current number of shoppers. The current number of shoppers may be an estimated number of shoppers and derived from a number of historical orders placed during particular time periods. In some examples, the current number of shoppers is determined based on a number of customers currently browsing the retailer's website.

Order assignment computing device 102 may compare the generated vendor capacity score for each vendor to a capacity score threshold. Vendors with a vendor capacity score beyond (e.g., exceeding) the capacity score threshold may be determined to have capacity.

Out of the vendors determined to have capacity, order assignment computing device 102 selects a vendor for order assignment. To determine the vendor, order assignment computing device 102 may apply one or more algorithms, such as a machine learning algorithm, to performance data, which may include portions of order data 340 and portions of vendor performance data 330. For example, order assignment computing device 102 may generate a final vendor score based on application of the one or more algorithms. Order assignment computing device 102 transmits assignment data 303 assigning the order to the vendor with the highest final vendor score. In some examples, the vendor may reject the assignment (e.g., via delivery processing system 120). If the assignment is rejected, order assignment computing device 102 may attempt to assign the order to the vendor with the next highest final vendor score.

In some examples, vendor computing devices 130a, 130b, and 130c of vendor systems 130 provide capacity updates 305 to order assignment computing device 102. Capacity updates 305 may include, for example, updates to one or more of business rules 310 and vendor capability data 320. Based on receiving capacity updates 305, order assignment computing device 102 updates database 116. In some examples, order assignment computing device 102 transmits a capacity check 307 to one or more of vendor computing devices 130a, 130b, and 130c. In response to receiving a capacity check 307, vendor computing devices 130a, 130b, and 130c may transmit a capacity update 305.

Figure 4:
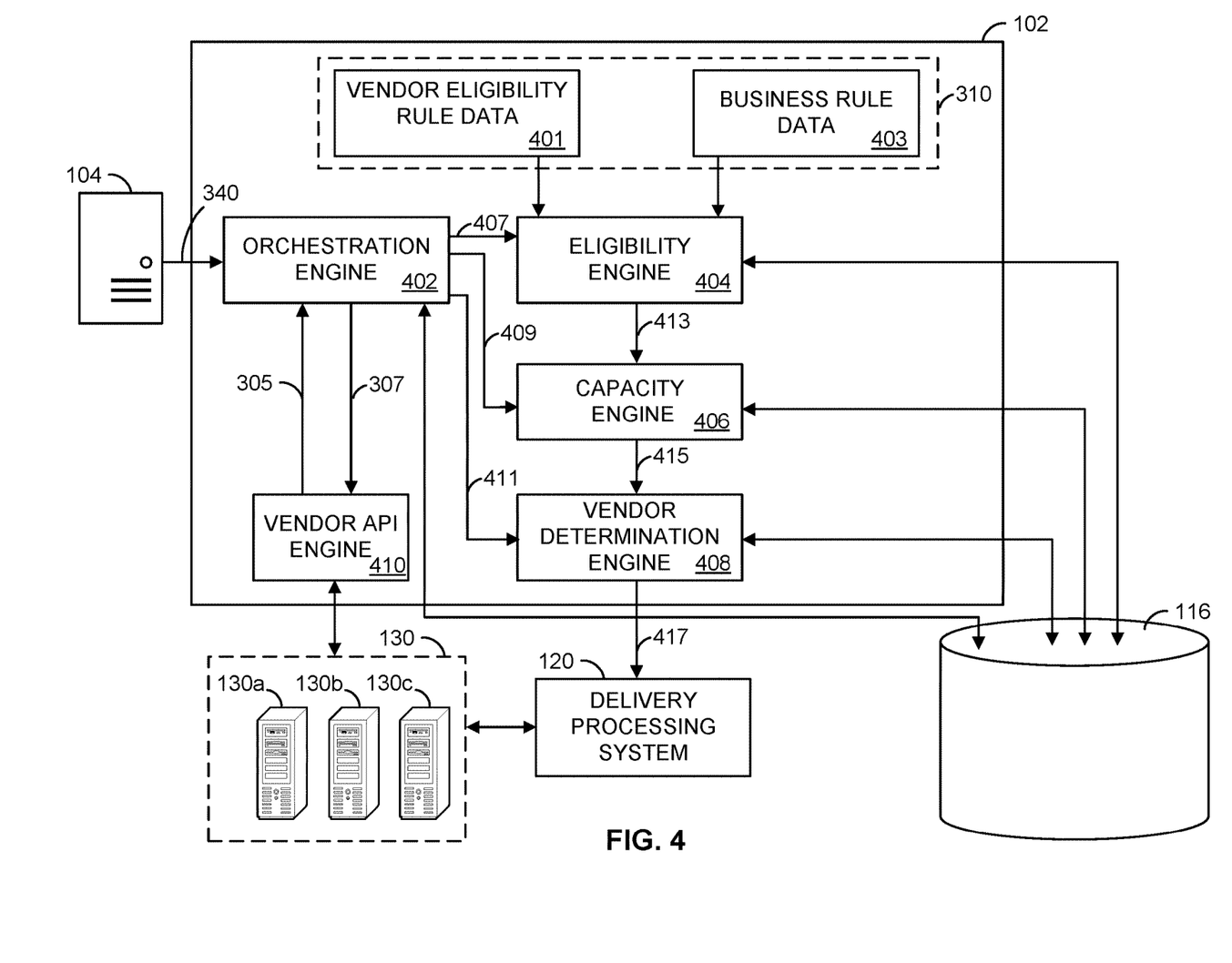
FIG. 4 is another block diagram illustrating examples of various portions of the order assignment computing device of FIG. 1 in accordance with some embodiments.

FIG. 4 illustrates further exemplary portions of the order assignment computing device 102 of FIG. 1. As indicated in FIG. 4, order assignment computing device 102 includes orchestration engine 402, eligibility engine 404, capacity engine 406, vendor determination engine 408, and vendor API 410.

In some examples, one or more of orchestration engine 402, eligibility engine 404, capacity engine 406, vendor determination engine 408, and vendor API 410 may be implemented in hardware. In some examples, one or more of orchestration engine 402, eligibility engine 404, capacity engine 406, vendor determination engine 408, and vendor API 410 may be implemented as an executable program maintained in a tangible, non-transitory memory, such as instruction memory 207 of FIG. 2, that may be executed by one or processors, such as processor 201 of FIG. 2.

In this example, orchestration engine 402 receives order data 340 from web server 104. Orchestrator engine 402 may parse order data 340, and provide at least a portion of the parsed data to each of eligibility engine 404, capacity engine 406, and vendor determination engine 408. For example, eligibility engine 404 may receive a first portion 407 of the parsed order data 340, capacity engine 406 may receive a second portion 409 of the parsed order data 340, and vendor determination engine 408 may receive a third portion 411 of the parsed order data 340. Each of the first portion 407, second portion 409, and third portion 411 of the parsed order data 340 may include any portion, or all of, parsed order data 340.

Eligibility engine 404 is operable to determine, based on one or more rules, a set of eligible vendors 413. Eligibility engine 404 may apply one or more business rules 310 to the first portion 407 of the parsed order data 340 and a portion of vendor capability data 320 and/or catalog data 370 for the items of the order.

In some examples, eligibility engine 404 applies a first machine learning model to the first portion 407 of the parsed order data 340 and the portions of vendor capability data 320 and/or catalog data 370 to determine if a vendor is eligible. In some examples, the first machine learning model is trained based on features generated from corresponding portions of historical order data and portions of vendor capability data 320 and or catalog data 370. In some examples, "high value" orders (e.g., orders over a predetermined value or sales amount) may not be eligible.

Capacity engine 406 is operable to apply one or more algorithms, such as a machine learning model, to the second portion 409 of the parsed order data 340 and to the corresponding portions of the vendor capability data 320 and the vendor performance data 330 for each eligible vendor 413 to determine capable vendors 415. In some examples, capacity engine 406 applies a second machine learning model to the second portion 409 of the parsed order data 340 and to the corresponding portions of the vendor capability data 320 and the vendor performance data 330 to determine if a vendor has capacity. In some examples, the second machine learning model is trained based on features generated from corresponding portions of historical order data and portions of vendor capability data 320 and vendor performance data 330.

Vendor determination engine 408 is operable to apply one or more algorithms, such as a machine learning model, to the third portion 411 of the parsed order data 340 and to the corresponding portions of the vendor capability data 320 and the vendor performance data 330 for each capable vendor 415 to determine a selected vendor 417. In some examples, vendor determination engine 408 applies a third machine learning model to the third portion 411 of the parsed order data 340 and to the corresponding portions of the vendor capability data 320 and the vendor performance data 330 to generate a final vendor score for each vendor. Selected vendor 417 may be the vendor with the highest final vendor score. In some examples, the third machine learning model is trained based on features generated from corresponding portions of historical order data and portions of vendor capability data 320 and vendor performance data 330. In some examples, a fourth machine learning model is trained based on features generated from corresponding portions of historical order data and portions of vendor capability data 320 and the third portion 411 of the parsed order data 340 for each capable vendor 415 (e.g., Vendor Capability+Order Data+Capacity). Vendor determination engine 408 may apply the fourth machine learning model corresponding portions of historical order data and portions of vendor capability data 320 and the third portion 411 of the parsed order data 340 for each capable vendor 415 to determine the selected vendor 417.

Figure 5:
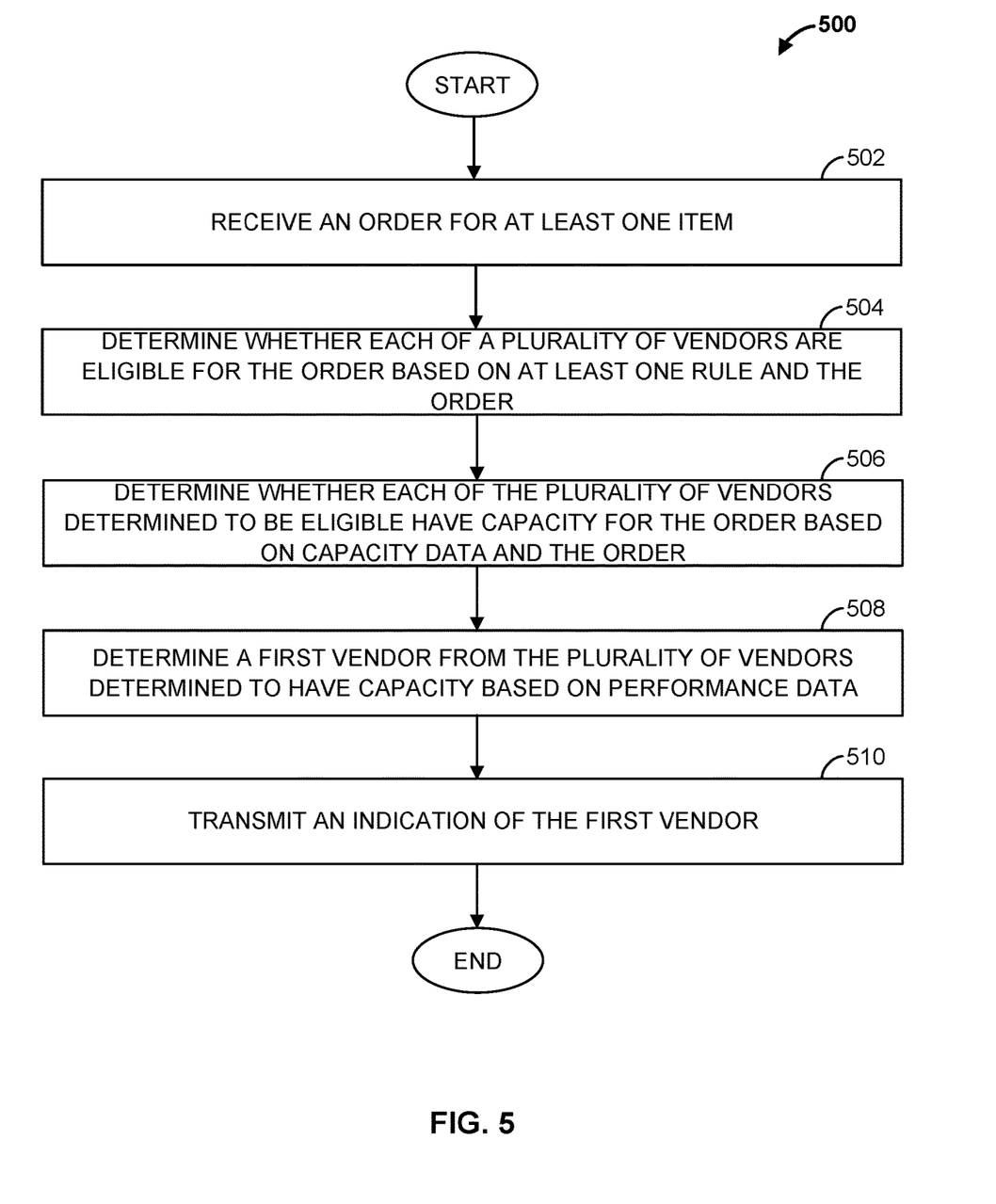
FIG. 5 is a flowchart of an example method that can be carried out by the order assignment computing device of FIG. 1 in accordance with some embodiments.

FIG. 5 is a flowchart of an example method 500 that can be carried out by the order assignment computing device 102 of FIG. 1. Beginning at step 502, an order for at least one item is received. For example, order assignment computing device 102 may receive order data 340 from web server 104. At step 504, a determination is made as to whether each of a plurality of vendors are eligible for the order based on at least one rule and the order. For example, order assignment computing device 102 may apply one or more business rules 310 to the order to determine eligible vendors 413.

Proceeding to step 506, a determination is made as to whether each of the plurality of vendors determined to be eligible at step 504 have capacity for the order. The determination is made based on capacity data and the order. For example, order assignment computing device 102 may apply one or more algorithms, such as a machine learning model, to the order and to portions of vendor capability data 320 and vendor performance data 330 for each eligible vendor 413 to determine capable vendors 415.

At step 508, a first vendor from the one or more vendors determined to have capacity is determined based on performance data. For example, order assignment computing device 102 may apply one or more algorithms, such as a machine learning model, to the order and to corresponding portions of vendor capability data 320 and vendor performance data 330 for each capable vendor 415 to determine a selected vendor 417. In some examples, a final vendor score is generated based on the application of the one or more algorithms. The determined vendor may be the vendor associated with the highest final vendor score.

The method then proceeds to step 510, where an indication of the first vendor is transmitted. For example, order assignment computing device 102 may transmit data identifying the selected vendor 417 to delivery processing system 120. A vendor, via one of vendor computing devices 130a, 130b, and 130c of vendor systems 130, may receive the assignment from delivery processing system 120. The method then ends.

Figure 6:
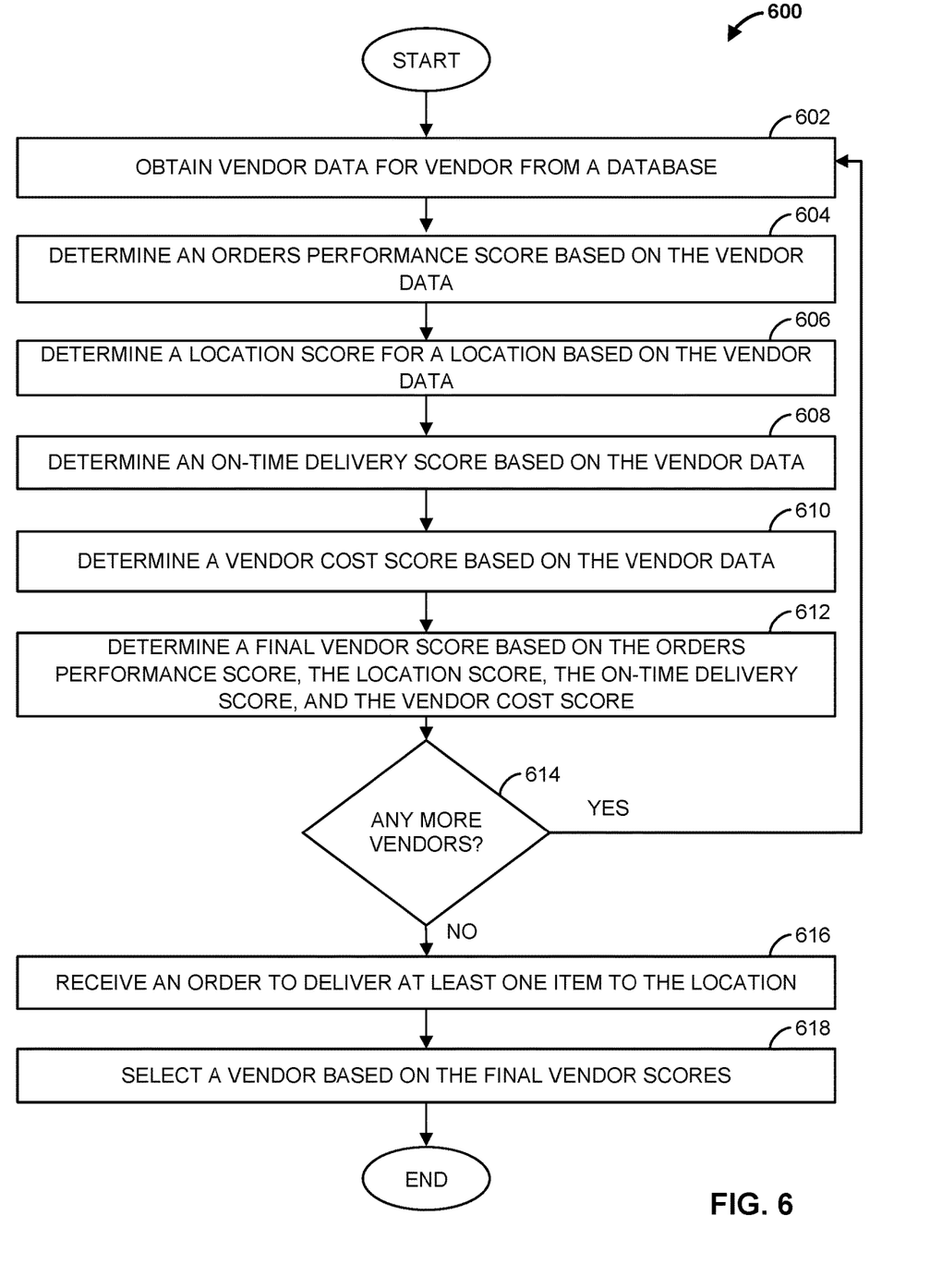
FIG. 6 is a flowchart of another example method that can be carried out by the order assignment computing device of FIG. 1 in accordance with some embodiments.

FIG. 6 is a flowchart of an example method 600 that can be carried out by the order assignment computing device 102 of FIG. 1. Beginning at step 602, vendor data for a vendor is obtained from a database. For example, order assignment computing device 102 may obtain, from database 116, portions of vendor capability data 320 and vendor performance data 330. At step 604, an orders performance score is generated based on the vendor data. For example, the orders performance score may be generated based on one or more of an average picking time over a previous period of time, an average delivery time over the previous period of time, and a percentage of late deliveries to all deliveries over the previous period of time.

Proceeding to step 606, a location score for a location (e.g., geographical area such as a zip code) is determined based on the vendor data. For example, the location score may be generated based on one or more of a number of orders delivered by the vendor to the location over a previous period of time, a number of timely deliveries by the vendor to the location over the previous period of time, and a number of untimely (e.g., late) deliveries by the vendor to the location over the previous period of time.

At step 608, an on-time delivery score is determined based on the vendor data. For example, the on-time delivery score may be generated based on one or more of a number of timely deliveries by the vendor over a previous period of time and a number of untimely deliveries by the vendor over the previous period of time. Continuing to step 610, a vendor cost score is determined based on the vendor data. For example, the vendor cost score may be generated based on a delivery cost charged by the vendor for the order.

At step 612, a final vendor score is determined for the vendor based on the order performance score, the location score, the on-time delivery score, and the vendor cost score. For example, order assignment computing device 102 may generate the final vendor score for the vendor by applying a weight to each of the order performance score, the location score, the on-time delivery score, and the vendor cost score, and combining (e.g., adding) the weighted scores. The weights may be configured by a user, and may vary.

Proceeding to step 614, a determination is made as to whether there are any more vendors. If there are any additional vendors, the method proceeds back to step 602 to obtain vendor data for the additional vendor. Otherwise, if there are no additional vendors, the method proceeds to step 616.

At step 616, an order to deliver at least one item to the location is received. At step 618, a vendor is selected to deliver the order to the location based on the final vendor scores. For example, order assignment computing device 102 may select the vendor with the highest final vendor score. In some examples, order assignment computing device 102 may transmit an indication of the selected vendor, such as to delivery processing system 120, to assign the selected vendor to the order. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a database;
   a processor communicatively coupled to the database; and
   a non-transitory memory storing instructions that, when executed, cause the processor to:
   receive order data for an order of at least one item;
   parse the order data to create a first parsed portion of the order data, a second parsed portion of the order data, and a third parsed portion of the order data;
   determine by an eligibility engine a first subset of vendors out of a plurality of vendors that are eligible for the order based on at least one rule and the first parsed portion of the order data;
   obtain, from the database, capacity data for each of the first subset of vendors;
   train a machine learning model by generating a set of features from a set of historical vendor capability data and a set of historical vendor performance data;
   determine, out of the first subset of vendors, a second subset of vendors, by applying the trained machine learning model to a set of vendor capability data and a set of vendor performance data, that have capacity for the order based on the capacity data corresponding to each of the second subset of vendors and the second parsed portion of the order data;
   obtain, from the database, performance data for each of the second subset of vendors;
   determine at least one vendor from the second subset of vendors based on the performance data corresponding to each of the at least one vendor and the third parsed portion of the order data; and
   transmit an indication of the at least one vendor.

2. The system of claim 1, wherein determining the first subset of vendors comprises:
   obtaining, from the database, vendor capability data for each of the plurality of vendors and catalog data for each of the at least one items; and
   applying the at least one rule the vendor capability data and the catalog data.

3. The system of claim 1, wherein determining the second subset of vendors comprises:
   obtaining, from the database, vendor capability data and vendor performance data for each of the first subset of vendors; and
   applying a trained machine learning model to the vendor capability data and the vendor performance data.

4. The system of claim 3, wherein determining the second subset of vendors comprises:
   generating a vendor capacity score for each of the first subset of vendors based on application of the trained machine learning model; and
   determining the second subset of vendors based on the generated vendor capacity scores.

5. The system of claim 1, wherein determining the at least one vendor comprises:
   obtaining, from the database, vendor performance data for each of the second subset of vendors; and
   applying a trained machine learning model to the vendor performance data.

6. The system of claim 5, wherein the instructions cause the processor to:
   obtain, from the database, historical vendor performance data;
   generate features based on the historical vendor performance data; and
   train the trained machine learning model with the generated features.

7. The system of claim 1, wherein determining the at least one vendor comprises:
   determining, for each of the second subset of vendors, an order performance score, a location score for a location for delivery of the order, an on-time delivery score, and a vendor cost score;
   determining, for each of the second subset of vendors, a final vendor score based on the order performance score, the location score, the on-time delivery score, and the vendor cost score; and
   determining the at least one vendor based on the final vendor score for each of the second subset of vendors.

8. The system of claim 7, wherein determining the final vendor score for each of the second subset of vendors comprises:
   determining a weighted final vendor score by:
   applying a first weight to the order performance score;
   applying a second weight to the location score;

applying a third weight to the on-time delivery score;
applying a fourth weight to the vendor cost score; and
determining the at least one vendor based on the weighted final vendor score for each of the second subset of vendors.

9. A method comprising:
receiving order data for an order of at least one item;
parsing the order data to create a first parsed portion of the order data, a second parsed portion of the order data, and a third parsed portion of the order data;
determining by an eligibility engine a first subset of vendors out of a plurality of vendors that are eligible for the order based on at least one rule and the first parsed portion of the order data;
obtaining, from a database, capacity data for each of the first subset of vendors;
training a machine learning model by generating a set of features from a set of historical vendor capability data and a set of historical vendor performance data;
determining, out of the first subset of vendors, a second subset of vendors by applying the trained machine learning model to a set of vendor capability data and a set of vendor performance data, that have capacity for the order based on the capacity data corresponding to each of the second subset of vendors and the second parsed portion of the order data;
obtaining, from the database, performance data for each of the second subset of vendors;
determining at least one vendor from the second subset of vendors based on the performance data corresponding to each of the at least one vendor and the third parsed portion of the order data; and
transmitting an indication of the at least one vendor.

10. The method of claim 9, wherein determining the first subset of vendors comprises:
obtaining, from the database, vendor capability data for each of the plurality of vendors and catalog data for each of the at least one items; and
applying the at least one rule the vendor capability data and the catalog data.

11. The method of claim 9, wherein determining the second subset of vendors comprises:
obtaining, from the database, vendor capability data and vendor performance data for each of the first subset of vendors; and
applying a trained machine learning model to the vendor capability data and the vendor performance data.

12. The method of claim 11, wherein determining the second subset of vendors comprises:
generating a vendor capacity score for each of the first subset of vendors based on application of the trained machine learning model; and
determining the second subset of vendors based on the generated vendor capacity scores.

13. The method of claim 9, comprising:
obtaining, from the database, vendor performance data for each of the second subset of vendors; and
applying a trained machine learning model to the vendor performance data.

14. The method of claim 13, wherein determining the at least one vendor comprises:
obtaining, from the database, historical vendor performance data;
generating features based on the historical vendor performance data; and
training the trained machine learning model with the generated features.

15. The method of claim 9, wherein determining the at least one vendor comprises:
determining, for each of the second subset of vendors, an order performance score, a location score for a location for delivery of the order, an on-time delivery score, and a vendor cost score;
determining, for each of the second subset of vendors, a final vendor score based on the order performance score, the location score, the on-time delivery score, and the vendor cost score; and
determining the at least one vendor based on the final vendor scores.

16. A non-transitory computer readable medium having instructions stored thereon, wherein the instructions, when executed by at least one processor, cause a device to perform operations comprising:
receiving order data for an order of at least one item;
parsing the order data to create a first parsed portion of the order data, a second parsed portion of the order data, and a third parsed portion of the order data;
determining by an eligibility engine a first subset of vendors out of a plurality of vendors that are eligible for the order based on at least one rule and the first parsed portion of the order data;
obtaining, from a database, capacity data for each of the first subset of vendors;
training a machine learning model by generating a set of features from a set of historical vendor capability data and a set of historical vendor performance data;
determining, out of the first subset of vendors, a second subset of vendors, by applying the trained machine learning model to a set of vendor capability data and a set of vendor performance data, that have capacity for the order based on the capacity data corresponding to each of the second subset of vendors and the second parsed portion of the order data;
obtaining, from the database, performance data for each of the second subset of vendors;
determining at least one vendor from the second subset of vendors based on the performance data corresponding to each of the at least one vendor and the third parsed portion of the order data; and
transmitting an indication of the at least one vendor.

17. The non-transitory computer readable medium of claim 16, further comprising instructions stored thereon that, when executed by at least one processor, further cause the device to perform operations comprising:
obtaining, from the database, vendor capability data for each of the plurality of vendors and catalog data for each of the at least one items; and
applying the at least one rule the vendor capability data and the catalog data.

18. The non-transitory computer readable medium of claim 16 further comprising instructions stored thereon that, when executed by at least one processor, further cause the device to perform operations comprising:
determining, for each search query of a plurality of search queries, a query-item value for each item of a plurality of items based on each item's corresponding first value, second value, and third value for each search query;
obtaining, from the database, vendor capability data and vendor performance data for each of the first subset of vendors; and
applying a trained machine learning model to the vendor capability data and the vendor performance data.

* * * * *